DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 4, 1975

931 O.G. 9

T931,002
DRY SPINNING PROCESS

William Kenneth Wilkinson, Waynesboro, Va., assignor to E. I. du Pont de Nemours and Co., Wilmington, Del.

Filed Sept. 18, 1973, Ser. No. 398,302
Int. Cl. D01f *7/00*
U.S. Cl. 264—206
No Drawing. 10 Pages Specification

Process for providing acid-dyeability to acrylic fibers that have been dry spun. The process comprises dry spinning in dimethylformamide a polymer blend of (a) a terpolymer of at least 75% acrylonitrile, at least 8% of a vinylpyridine and at least 2% of a neutral ethylenically unsaturated monomer copolymerizable with acrylonitrile, by weight, and (b) a terpolymer of at least 85% acrylonitrile, up to 1% of a vinylarenesulfonic acid, and up to 14% of a neutral ethylenically unsaturated monomer copolymerizable with acrylonitrile, by weight, the sum of the components of each terpolymer being 100%, and the terpolymers being mixed in amounts to provide at least about 5% by weight vinylpyridine in polymerized form in the polymer blend.